United States Patent
Kim et al.

(10) Patent No.: US 6,489,760 B2
(45) Date of Patent: Dec. 3, 2002

(54) HIGH SENSITIVITY DISPLACEMENT MEASURING DEVICE USING LINEAR VARIABLE DIFFERENTIAL TRANSFORMER

(75) Inventors: Soo-Hyun Kim, Taejon (KR); Dong-June Choi, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/766,342

(22) Filed: Jan. 19, 2001

(65) Prior Publication Data

US 2002/0030486 A1 Mar. 14, 2002

(30) Foreign Application Priority Data

Feb. 2, 2000 (KR) .............................................. 00-5196

(51) Int. Cl.[7] .......................... G08C 19/06; H01F 21/06
(52) U.S. Cl. ............................ 324/207.18; 324/207.17; 318/657; 336/45; 340/870.36
(58) Field of Search ...................... 324/207.17–207.19; 336/45; 340/870.36; 318/657

(56) References Cited

U.S. PATENT DOCUMENTS

| | | | | |
|---|---|---|---|---|
| 4,121,049 A | * | 10/1978 | Roeber | 178/18 |
| 5,117,181 A | * | 5/1992 | Clergeot et al. | 324/207.18 |
| 5,469,053 A | | 11/1995 | Laughlin | 324/207 |

FOREIGN PATENT DOCUMENTS

GB  1032931  *  6/1966  ............ 324/207.18

OTHER PUBLICATIONS

Saxena et al., "A Self–Compensated Smart LVDT Transducer," IEEE Transactions on Instrumentation and Measurement, vol. 38, No. 3, Jun. 1989.*

Kano et al., "New Linear variable Differential Transformer With Square Coils," IEEE Transactions on Magnetics, vol. 26, No. 5, Sep. 1990.*

Hasebe et al., "New Type Linear Vaiable Differential Transformer Position Transducer", *IEEE Transactions on Instrumentation and Measurement,* vol. 38, No. 2pgs. pp. 407–409.

* cited by examiner

*Primary Examiner*—Edward Lefkowitz
*Assistant Examiner*—Darrell Kinder
(74) *Attorney, Agent, or Firm*—Vidas, Arrett&Steinkraus PA

(57) ABSTRACT

The present invention is intended to provide a ultra-precision high sensitivity displacement measuring device which has such a high resolution as to be able to make submicron measurement.

According to the invention, there is provided a displacement measuring device with high resolution, comprising: an electromagnetic system (10) which forms a closed loop of magnetic blocks (17,19) and which houses primary coil bundles (11) and secondary coil bundles (13) for forming magnetic fields within said closed loop of magnetic blocks (17,19); plate springs (20) which include displacement input parts (21) and displacement output zones (24) fixed to the cores (14) having the secondary coils wound around them and which act to guide so that the displacement output zones (24) can output the displacement amplified in proportional to the displacement input to the displacement input parts (21); and a supporting mechanism (30) for supporting the displacement input parts (21) of said plate springs (20) so that the displacement may be input only in one axial direction.

8 Claims, 6 Drawing Sheets

HIGH SENSITIVITY DISPLACEMENT MEASURING DEVICE USING LINEAR VARIABLE DIFFERENTIAL TRANSFORMER

FIELD OF THE INVENTION

The present invention relates to a linear variable differential transformer (shortly 'LVDT' in the following) widely used for measurement of displacements and particularly to a high sensitivity displacement measuring device using the LVDT, which can handle submicron measurements with a high indifference to surrounding environment, noise and the like and with an increased resolution.

DESCRIPTION OF THE PRIOR ART

The sensitivity used in the field of the displacement measurements represents the ratio of the analog output voltage relative to the input displacement to be measured in a displacement measuring device using a LVDT. For example, a high sensitivity means that the output voltage is largely generated with respect to a predetermined displacement For such an ordinary analog output voltage generator, the resolution is closely related to the noise and sensitivity.

Resolution=Noise/Sensitivity

In practical circumstances, the resolution is influenced severely by the noises caused by the surrounding environment or various other factors. A high sensitivity is advantageous in order that the insensibility to outside factors can be maintained and the high resolution can be high enough to realize application in submicron area, with the minimum measurable displacement lowered FIG. 1 shows schematically a displacement measuring device using a LVDT according to the conventional art.

As shown in FIG. 1, the displacement measuring device according to the conventional art has the form of cylinder, in which there is disposed a primary coil bundle 2 in cylindrical form, with the secondary coil bundles 3H and 3L positioned on the top and bottom thereof. In the center of the primary coil bundle 2 and secondary coil bundles 3H and 3L, there is disposed a magnetic core 4, to the lower end of which there is connected a rod 5, having a contact probe 6 disposed at its lower end. Under the lower secondary coil bundle 3L, ball bearings 8 are disposed around the rod 5 to facilitate the vertical movement of the rod 5, with the movement of which there expands or contracts a spring 9 disposed below the ball bearings 8. The primary coil bundle 2, upper and lower coil bundles 3H and 3L, ball bearings 8 and spring 9 are housed in a housing 7, under which housing the lower part of contact probe 6 protrudes.

Thus the contact probe 6 protruding from the bottom end of the housing 7 moves up or down according as the device detects a displacement, thereby the magnetic core 4 connected to the rod 5 moves up or down the same distance.

On the other hand, when an electric voltage is applied to the primary coil bundle 2, a magnetic field is generated within the displacement measuring device 1, causing the magnetic core 4 to move in accordance with the displacement input. Thus, the distribution of magnetic fields in the respective secondary coil bundles 3H and 3L within the displacement measuring device 1 are changed and so the values for the difference in voltage in the form of differential voltages which are induced in the respective secondary coil bundles 3H and 3L due to the change in the magnetic fields are also changed, wherein the values for such differential voltages are proportional to the displacement inputs.

For such displacement measuring devices based on the conventional LVDT, an improvement in the sensitivity can be expected when the ratio of the windings for the secondary coil bundles to the windings for the primary coil bundle are large. Therefore, the number of the windings for the secondary coil bundles needs to be increased to increase the measurement sensitivity, with the result that the size of an overall displacement measuring device must be increased.

However, if the coil windings are more increased, the number of the coil windings must be limited due to capacity saturations, generation of non-linear elements or the like. Therefore, there was a disadvantage that a high selectivity is hardly attained In addition, the type of measuring device with the components of a guide such as ball bearings, springs and the like has the drawback that sub-micron resolving power can not be attained because of the intrinsic non-linearity.

SUMMARY OF THE INVENTION

The present invention was created to resolve the above-described problems with the conventional art and the object of the present invention is to provide a super-precision high sensitivity displacement measuring device which is improved in its construction to facilitate a super-precision measurement and which has such a high resolving power as to be able to make sub-micron measurement due to increased sensitivity by using a guiding means for amplifying an input displacement To that end, there is provided according to the invention a displacement measuring device with position resolving power, comprising: an electromagnetic system which forms a closed loop of magnetic bodies and which houses primary coils and secondary coils for forming magnetic field within said closed loop; guiding means which include displacement input parts and displacement output regions and which act to guide so that the displacement output regions can produce an output amplified in proportional to the displacement input to the displacement input parts, and a supporting means for supporting the displacement input parts of said guiding means so that the displacement may be input only in one axial direction.

According to another aspect of the invention, there is provided a displacement measuring device, wherein said electromagnetic system includes a plurality of loop magnets in E-form, beam magnets connecting the upper and lower free ends of said loop magnets to form a closed loop, a plurality of primary coils wound around inward projections of said loop magnets, a plurality of magnetic cores which extend parallel to said beam magnets between opposite primary coils and which are positioned at a predetermined distance of less than millimeters from the end of inward projection of a loop magnet, the inward projection being wound by primary coil, and a plurality of secondary coils winding around said magnetic cores, wherein the magnetic cores are fixed, at their ends, to the displacement output regions of said guiding means.

According to still other aspect of the invention, there is provided a displacement measuring device, wherein said cores and said beam magnets are of the same material.

According to still other aspect of the invention, there is provided a displacement measuring device, wherein said guiding means, as plate springs with a thickness of some hundred micrometers, are so constructed that, below the lower edges of said plate springs there protrude the displacement input parts, above the displacement input parts there are positioned fixing regions, attached to the beam magnets, and on both sides of the fixing regions there are connected rotatable or tiltable regions, and that said fixing regions and said rotatable regions are provided in a symmetric manner in the upper edges as well beside the lower edges of the plate springs and displacement output regions connect the rotatable regions on the upper and lower edges of the plate spring; and wherein between a fixing region and rotatable regions, between a displacement input part and rotatable legions and between rotatable regions and a displacement output region, a connecting section or sections are connected, so that when a displacement is input in the displacement input parts, rotatable regions rotate around the connecting sections, as fulcrums, connecting the fixing legions and the rotatable regions to cause the displacement output as determined by a mathematical equation at the displacement output regions.

According to an aspect of the invention, there is provided a displacement measuring device, wherein said plate springs are made of beryllium-copper and are attached to both sides of said electromagnetic system so that the both plate springs may extend parallel to the closed loop of the electromagnetic system.

According to an aspect of the invention, there is provided a displacement measuring device, wherein said supporting means comprises a fixing block to be attached to the electromagnetic system, a movable block to have a contact probe mounted and to be fixed to the displacement input parts of said guiding means and supporting beams to connect said fixing block with said movable block.

According to still other aspect of the invention, there is provided a displacement measuring device, wherein said movable block is fixed, on its both faces, to the displacement input parts of the two sheets of plate springs on the both sides of said electromagnetic system, and said contact probe mounted on the movable block is oriented in the direction opposite to the beam magnets.

And, according to still other aspect of the invention, there is provided a displacement measuring device, wherein said supporting beams have the form of flat bars and connect the upper and lower faces of both the fixing block fixed to the bottom surface of the electromagnetic system and the movable block.

Thus, the high sensitivity displacement measuring device according to the present invention has the advantage that measurements in the sub-micron area can be easily made through the improvement in, for example, the coil arrangement, the closed loop structure and the decreased gaps at the opposite ends of magnetic cores, and particularly through the improvement in the output sensitivity based on the increased displacement amplification of the magnetic cores by the help of the displacement amplification mechanism of leaf springs, and that the control of the contact force for the probe is possible through the adjustment of the elastic modulus for leaf springs and the distances between connecting sections on the leaf springs.

Further, the present invention has another advantage that the movable block moves only in one direction, with supporting bars bearing the block, and the structure is less sensitive to the variation in external environment, i.e. noise or changing temperature thanks to the same material for both the beam magnets and the magnetic cores.

DESCRIPTION OF PREFERRED EMBODIMENTS

A preferred embodiment of the present invention will be described in detail below in conjunction with the accompanying drawings.

Figure 1:
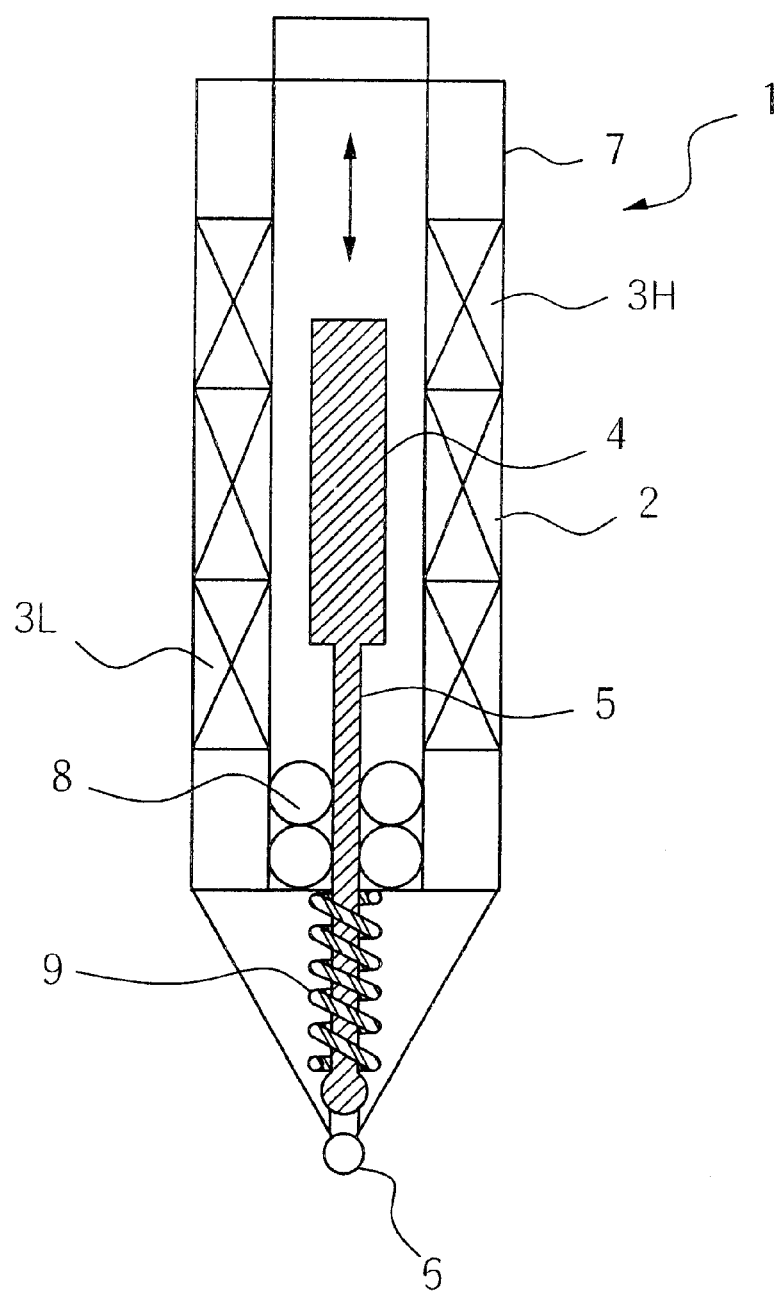
FIG. 1 shows the schematic view of a displacement measuring device by using a linear variable differential transformer according to the conventional art.
Figure 2:
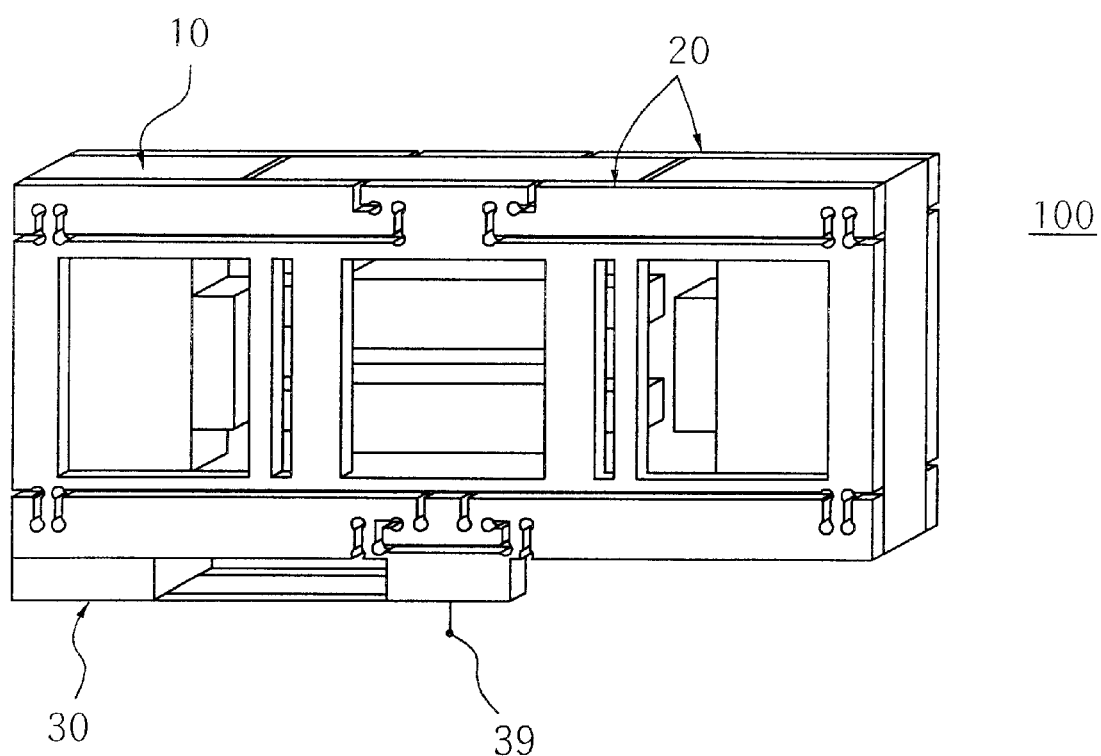
FIG. 2 shows the perspective view of a high sensitivity displacement measuring device according to one embodiment of the present invention.
Figure 3:
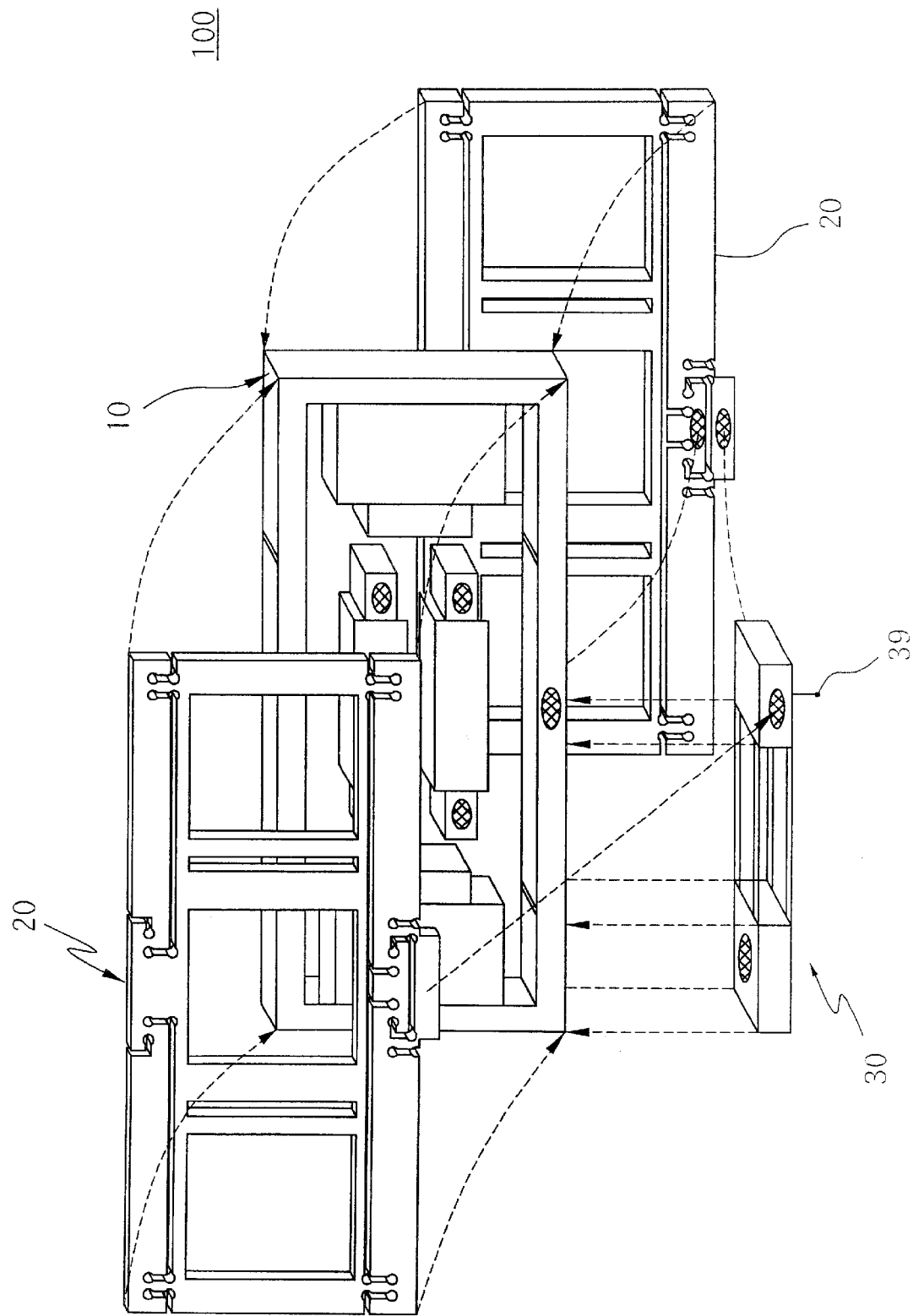
FIG. 3 shows an assembly drawing for the high sensitivity displacement measuring device of FIG. 2.

As shown in FIGS. 2 and 3, the displacement measuring device according to the invention comprises an electromagnetic system 10 which includes ferromagnetic bodies, coils etc. and within which magnetic flux is generated, a supporting means 30 for supporting a contact probe into which a displacement is input and plate springs 20 which are fixed to the magnetic cores of the ferromagnetic bodies and to the supporting means 30. Here, the plate springs 20, as guiding means, make the magnetic cores move with an amplified output displacement relative to input displacement.

Figure 4:
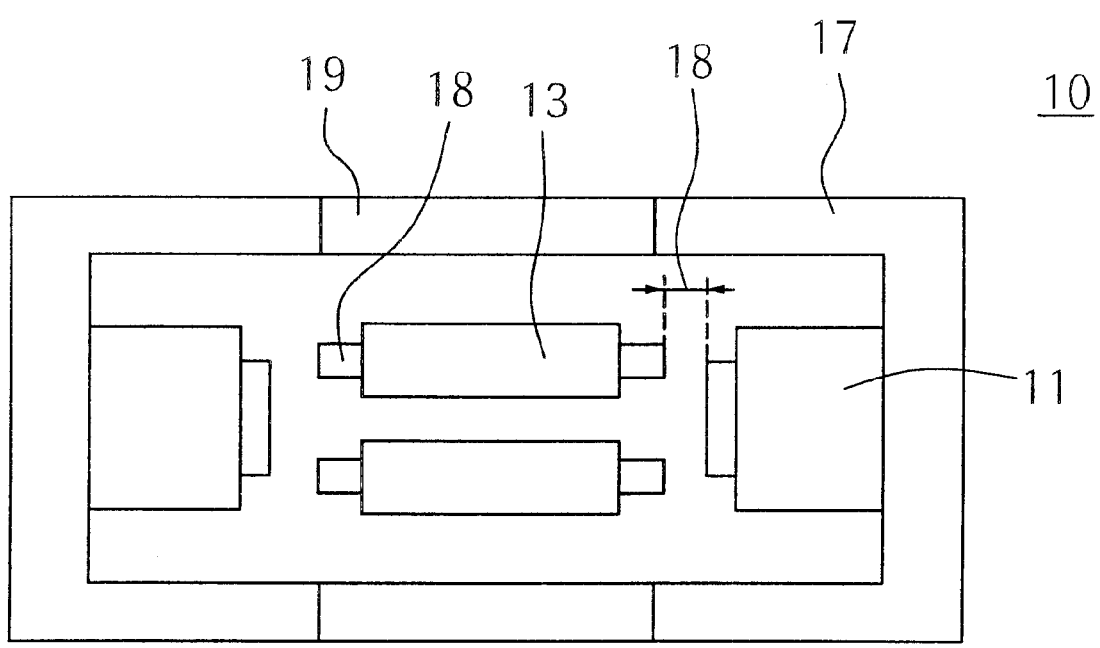
FIG. 4 shows a front view of an electromagnetic system of the high sensitivity displacement measuring device of FIG. 2.

Referring to FIG. 4, the electromagnetic system 10 houses two primary coil bundles 11 to the right and left sides. Between the primary coil bundles 11, there are positioned two secondary coil bundles 13 which are wound on magnetic cores 14. Here, each of the secondary coils 13 bundles has a predetermined length. Also, there are air gaps 18 formed between each of loop magnets 17 through each primary coil bundles 11 and each the magnetic core 14. the two magnetic cores 14 are extended parallel to each other. Each of the air gaps is smaller than a few mm Here, each of the magnets loop 17 has an inward projection, thereby it is shaped like an 'E' character on which the primary coils 11 are wound.

The primary coil bundles 11 are wound on the inward projections of two loop magnets 17 in the form of 'E', and the spaces between the upper and lower free ends of the two loop magnets 17 are filled with beam magnets 19 connecting to the loop magnets 17. Thus, the two loop magnets 17 and the two beam magnets 19 are connected together to form a closed loop, within which two secondary coil bundles 13 and two primary coil bundles 11 are positioned. Here, the loop magnets 17 and beam magnets 19 together with primary coil bundles 11 are stationary, and on the other hand, the two secondary coil bundles 13 with the magnetic cores 14 are movable freely. The length of each beam magnet 19 is the same as that of a magnetic core 14 of the secondary coil bundle 13, and the materials for both the magnetic cores 14 and the beam magnets 19 are the same, so that they have the same thermal expansion and contraction. Thus, the thermal expansion and contraction for the magnetic cores 14 is balanced with that for the beam magnets 19, so that the air gaps 18 between the free ends of magnetic cores 14 and the fee ends of spool projections for primary coil bundles 11 can be maintained constant regardless of a temperature variation. On the other band, when a current is applied to the primary coil bundles 11, a magnetic field is formed within the electromagnetic system 10. In response, the magnetic cores 14 of the two secondary coil bundles 13 are moved along with the input of displacement generated relative to the reference position to cause the magnetic flux permeating the coils of secondary coil bundles 13 wrapped around the magnetic cores 14 to exhibit change in proportion with respective displacements. Thus, there is induced an induced electric voltage in the secondary coils. Here, the difference of the induced electric voltages represents a differential voltage.

Figure 5:
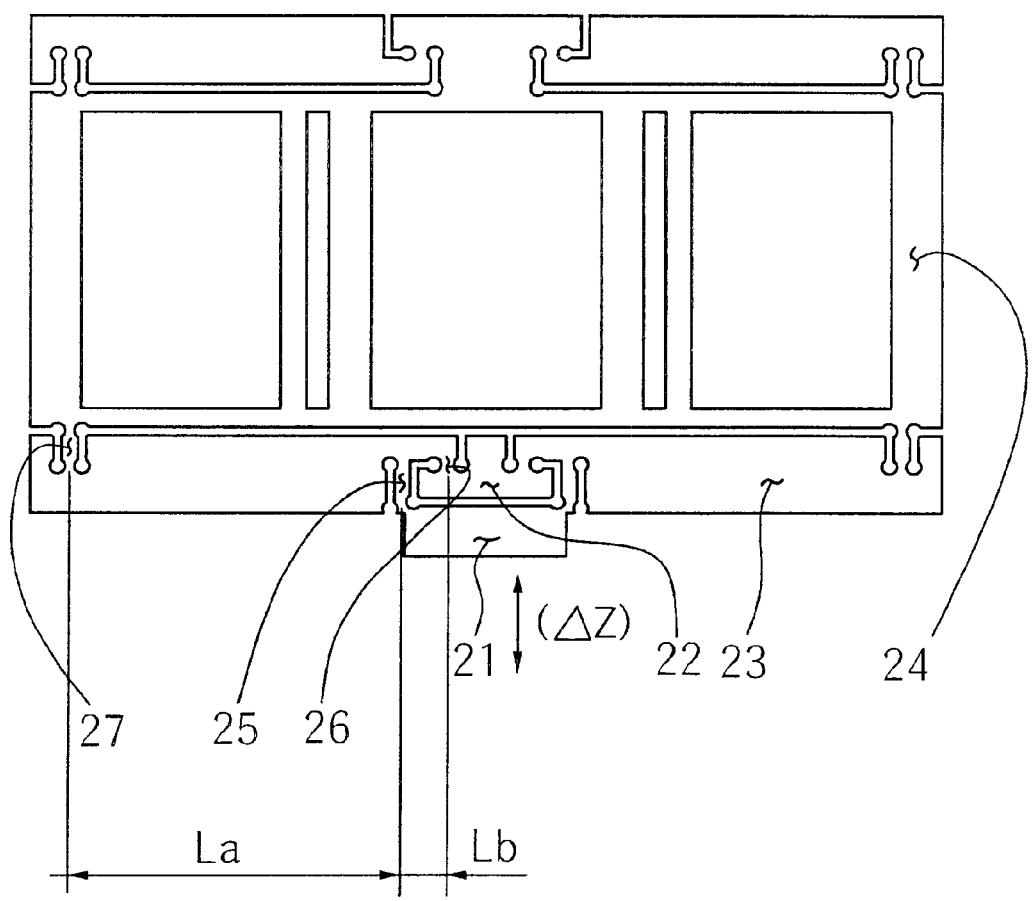
FIG. 5 shows a front view of a guiding system of the high sensitivity displacement measuring device of FIG. 2.

On the other hand, the plate spring 20 as a guiding means is made of beryllimn-copper (BeCu) with the thickness of some hundred micrometers, as shown in FIG. 5. In particular, it is formed from etching part of a beryllium-copper plate by etching technique. The plate spring 20 so etched is formed in several regions, and is characterized in that all regions are integrally connected so that a displacement at one region may lead to other displacements at all the regions of the plate spring 20. As shown in FIG. 5, the plate spring 20 is divided into predetermined regions which are symmetrically arranged in both the upper and lower part of the plate.

According to the definition of regions employed in the illustration, the region protruding from the middle lower edge of the spring 20 is termed as 'A' region 21, the region bounded by the reversed T-formed area in the middle lower edge is termed as 'B' region 22, the regions to the right and left side of the region 22 are termed as 'C' region 23 and the region formed in the middle part of the plate spring 20 is defined as 'D' region 24. The narrow regions connecting the region 21 and the regions 23 are termed as the first connecting sections 25, the areas between the region 22 and the regions 23 are termed as the second connecting sections 26, and the areas connecting to the regions 23 and the region 24 are designated as the third connecting sections 27. The description for the lower part of the plate spring 20 substantially holds for the upper part of the plate spring 20 not specifically mentioned. The assembly and function of the plate spring 20 so arranged will be described in detail in the following.

Two plate springs 20 so formed are attached to the front and back faces of the electromagnetic system 10. Specifically, as clear from FIG. 3, the upper and lower beam magnets 19 are fixedly attached to the upper and lower 'B' regions 22, and the end faces of the magnetic cores 14 for two secondary coil bundles 13 are adhered to the positions of the regions 24 in the middle area of plate springs 20, whereby the two magnetic cores 14 can be maintained at a predetermined constant spacing and simultaneously the air gaps 18 between the end positions of magnetic cores 14 and the end positions of the inward projections of E-formed loop magnets 17 can be maintained constant, as depicted in FIG. 4. On the other hand, the elliptical hatched portions in FIG. 3 represent adhesive positions to bind the plate spring 20 and the electromagnetic system 10.

Figure 6:
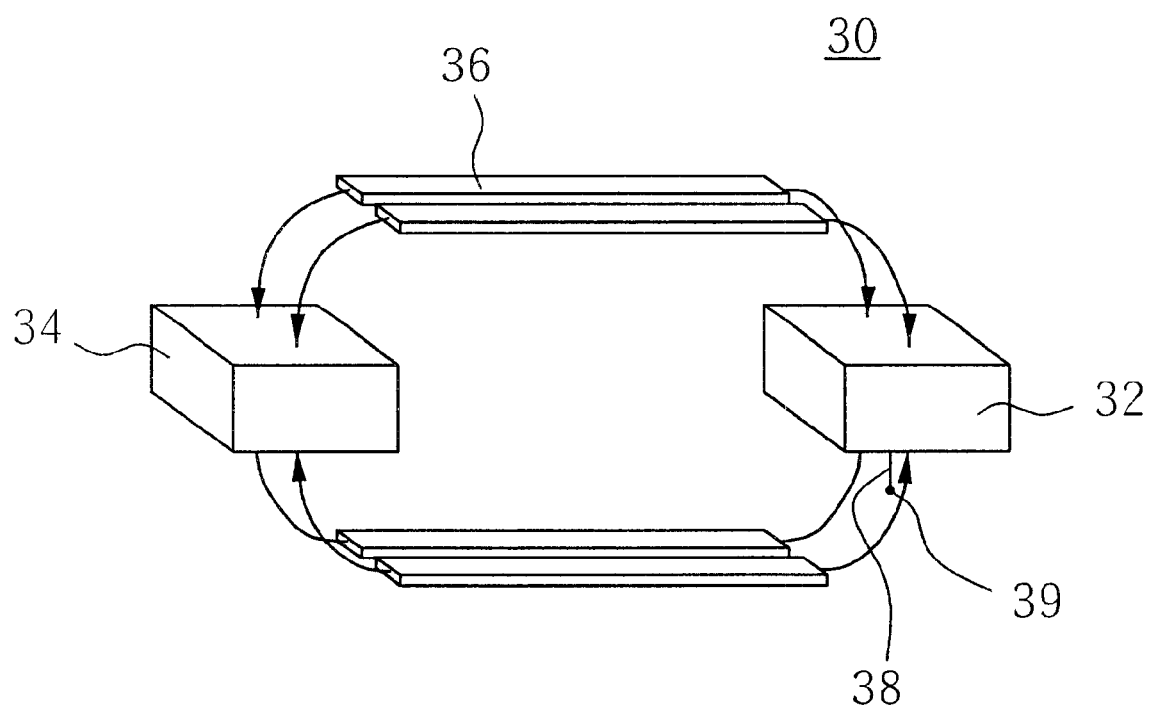
FIG. 6 shows a perspective view for a supporting means of the high sensitivity displacement measuring device of FIG. 2.

As shown in FIG. 6, a supporting means 30 includes a stationary block 34 which is fixed to the bottom face of the loop magnets 17 on one end side, a movable block 32 which is positioned at the middle portion of the bottom face of the beam magnets 19, and four supporting beams 36 connecting to the stationary and movable blocks 34 and 32. Thus, the movable block 32 connected to the stationary block 34 through supporting beams 36 is positioned on the bottom surface of the beam magnets 19. Here, the front and back fits of the movable block 32 are fixedly attached to the 'A' regions 21 of the plate springs 20. Therefore, the movable block 32 displaces only in vertical direction by the help of supporting beams 36 and the plate springs 20 and so causes the 'A' regions 21 of the plate springs 20 also to make the same amount of displacement, eventually resulting in the displacement of the 'D' regions 24 of the plate springs 20.

Furthermore, the movable block 32 is fixed, on its bottom surface, with a rod 38, on the free end of which a contact probe 39 is provided.

In the following, the function of the plate spring 20 will be described.

As described above, the 'A' regions 21 are fixed to the movable block 32, the 'B' regions 22 are fixed to the beam magnets 19, and the 'D' regions 24 are fixed to the magnetic cores 14 of the secondary coil bundles 13. In this state, when the movable block 32 makes a movement in line with the displacement input, the displacement of the movable block 32 is transmitted to the regions 'C' via the first connecting sections 25 on each of the plate springs 20. Because the leading areas of the regions 'C' 23 are connected to each other via the second connecting sections 26 of a fixing region 'B' 22, the displacement is transmitted to the respective 'D' regions 24 through the third connecting sections 27 positioned in distal areas of the regions 'C' 23. In other words, given the displacement input the regions 'C' transmit to the regions 'D' 24 the input displacement amplified in proportion to the distance between the first and second connecting section 25 and 26 as well as the distance between the second and third connecting section 26 and 27, in accordance with the principle of leverage. Accordingly, the displacement input acting on the movable block 32 is amplified through the plate springs 20, so that the magnetic cores 14 of the secondary coil bundles 13 make the movement substantially equal to the amplified displacement output.

This is expressed as the equation (1) as given below:

$$\Delta Z' = \frac{(La + Lb)}{Lb} \times \Delta Z \qquad (1)$$

wherein, $\Delta Z'$ stands for an output displacement, $\Delta Z$ does for an input displacement, La denotes a distance between the first connecting section and the third correcting section, and Lb does as distance between the first connecting section and the second connecting section. The operation of the high sensitivity displacement measuring device constructed as above is described in detail below.

When a displacement is detected at the contact probe 39, the rod 38 moves up or down the same amount as that displacement The movable block 32 also makes the same amount of vertical movement, so that the regions 'A' 21 of the plate springs 20, fixed to the movable block 32, make the same movement as the displacement The movement of the regions 'A' 21 is transferred to the regions 'C' 23, wherein the displacement so passed down is amplified to the output displacement as determined by the above equation (1) at the third connecting sections 27 to cause the regions 'D' 24 to make the same movement.

With the movement of the regions 'D' 24, the two secondary coil bundles 13 and magnetic cores 14, which are secured to these regions, also move up or down the same distance as the amplified displacement output.

On the other hand, when an electric voltage is applied to the primary coil bundles 11, within the high sensitivity displacement measuring device there is formed a magnetic field, the distribution of which is changed due to the movement of two magnetic cores 14. Such a change in magnetic field causes the change in the voltage induced in the secondary coil bundles 13 or the value for differential voltage. Thus, the value for differential voltage is output in proportional to the amplified displacement output relative to the initial displacement input, as can be determined by the forgoing equation 1.

It is to be understood that, while the invention was described only with respect to a preferred embodiment, the invention is never restricted to that embodiment and a variety of modifications and alterations would be possible to a man skilled in the art by referring to the description or drawings presented here and within the spirit of the invention and thus those modifications or alterations are to fall within the scope of the invention, which scope should be limited only by the attached claims.

What is claimed is:

1. A displacement measuring device with position resolving power, comprising:

an electromagnetic system which forms a closed loop of magnetic bodies and which houses primary coils and secondary coils for forming magnetic fields within said closed loop of the magnetic bodies;

guiding mechanism which include displacement input parts inputting a first displacement and displacement output regions outputting a second displacement which is amplified in proportion to the first displacement inputted to the displacement input parts; and a supporting mechanism for supporting the displacement input parts of said guiding mechanism so that the first displacement may be input only in one axial direction of the displacement input parts.

2. The device according to claim 1, wherein said electromagnetic system includes:

a plurality of loop magnets in E-form, each of the loop magnets has an inward projection;

beam magnets connecting to upper and lower free ends of said loop magnets to form a closed loop;

a plurality of primary coils wound around the inward projections of said loop magnets;

a plurality of cores which extend parallel to said beam magnets between oppositely located primary coils and which are positioned from the end of the inward projection of the loop magnet; and a plurality of secondary coils winding around said cores, the ends of the cores are fixed to the displacement output regions of said guiding mechanism.

3. The device according to claim 2, wherein said cores and said beam magnets are of the same material.

4. The device according to claim 1, wherein said guiding mechanism, as plate springs with a thickness of some hundred micrometers, are so constructed that, below the lower edges of said plate springs there prude the displacement input parts, above the displacement input parts there are positioned fixing zones, attached to the beam magnetic blocks, and on both sides of the fixing zones there are connected rotatable or tiltable zones, and that said fixing zones and said rotatable zones are provided in a symmetric manner in the upper edges as well beside the lower edges of the plate springs and displacement output zones connect the rotatable zones on the upper and lower edges of the plate springs;

and wherein between a fixing zone and rotatable zones, between a displacement input part and rotatable zones and between rotatable zones and a displacement output zone, a connecting section or sections are connected, so that when a displacement is input in the displacement input part, rotatable zones can rotate around the connecting sections, as fulcrums, connecting the fixing zone and the rotatable zones to cause the displacement output as determined by the following equation at the displacement output zone:

$$\Delta Z' = \frac{(La + Lb)}{Lb} \times \Delta Z$$

wherein $\Delta Z'$ stands for the output displacement, $\Delta Z$ stands for the input displacement, La stands for the distance between the connecting section connecting a displacement input part and a rotatable zone and the connecting section connecting a rotatable zone and a displacement output zone, and Lb stands for the distance between the connecting section connecting a displacement input part and a rotating zone and the connecting section connecting a fixing zone and a rotatable zone.

5. The device according to claim 4, wherein said guiding mechanism is made of beryllium-copper and is attached to both sides of said electromagnetic system.

6. The device according to claim 1, wherein said supporting means comprises:

a fixing block connected to an edge of the guiding mechanism;

a movable block inputting a displacement via a contact probe attached thereto, the movable block is fixed to the displacement input parts of said guiding mechanism; and supporting beams connecting said fixing block with said movable block.

7. The device according to claim 6, wherein said contact probe is oriented in the direction opposite to the beam magnets.

8. The device according to claim 6, wherein said supporting beams comprise flat bars, the supporting beams connect the upper and lower faces of both the fixing block fixed to the bottom surface of the electromagnetic system and the movable block.

* * * * *